(12) United States Patent
Eckel

(10) Patent No.: US 7,263,442 B2
(45) Date of Patent: Aug. 28, 2007

(54) MOBILE COMMUNICATION TERMINAL

(75) Inventor: Andreas Eckel, Holzmaden (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/519,434

(22) PCT Filed: Jul. 1, 2002

(86) PCT No.: PCT/EP02/07233

§ 371 (c)(1),
(2), (4) Date: Jul. 22, 2005

(87) PCT Pub. No.: WO2004/003472

PCT Pub. Date: Jan. 8, 2004

(65) Prior Publication Data
US 2005/0272447 A1 Dec. 8, 2005

(51) Int. Cl.
G01W 1/18 (2006.01)
(52) U.S. Cl. ....................................... 702/3
(58) Field of Classification Search .................... 702/3, 702/4, 5; 342/120, 121
See application file for complete search history.

(56) References Cited

U.S. PATENT DOCUMENTS 6,055,477 A * 4/2000 McBurney et al. ......... 701/207
6,462,703 B2 * 10/2002 Hedrick ...................... 342/120

FOREIGN PATENT DOCUMENTS

| EP | 1 136 788 A1 | 9/2001 |
| JP | 4 296690 | 10/1992 |
| WO | WO 01/13069 A1 | 2/2001 |
| WO | WO 02/03093 A1 | 1/2002 |

* cited by examiner

Primary Examiner—Donald E McElheny, Jr.
(74) Attorney, Agent, or Firm—Perman & Green, LLP

(57) ABSTRACT

The invention relates to a mobile communication terminal, advantangeously a mobile phone. According to the invention, the communication terminal includes a barometric altimeter. The altimeter can be recalibrated using means for determining the horizontal position of the mobile communication terminal, and means for determining the ground level at the horizontal position. The invention relates further to a method of calibrating a barometric altimeter of a mobile communication terminal, in which the horizontal position of the mobile communication terminal is determined, the ground level is determined using the determined horizontal position, the atmospheric pressure is measured at the location of the mobile communication terminal and the determined ground level is used to calibrate the barometric altimeter. Further, the invention relates to a method of determining the altitude of a mobile communication terminal, by establishing the horizontal position of the mobile communication terminal and determining the ground level at the horizontal position.

31 Claims, 5 Drawing Sheets

MOBILE COMMUNICATION TERMINAL

This application is the National Stage of International Application No. PCT/EP2002/007233, International Filing Date, Jul. 1, 2002, which designated the United States of America, and which international application was published under PCT Article 21(2) as WO Publication No. WO 2004/003472 A1.

The present invention relates to mobile communication terminal, in particular to mobile communication terminal for determining an altitude. The invention relates further to a method of calibrating a barometric altimeter of a mobile communication terminal.

BACKGROUND ART

With the increasing popularity of portable communication handsets, for example mobile phones, manufactures of the handsets are beginning to incorporate into the handset, in addition to the basic communication apparatus, value-added features such as calculators and video games.

A value-added feature that has been proposed for mobile phones intended for use in open areas of varying terrain, by for example ramblers and orienteers, is a barometric altimeter.

A barometric altimeter has altitude-measuring means which typically comprise a pressure sensor for measuring the atmospheric pressure and a processor for calculating the altitude. The altitude of the mobile phone is calculated using the atmospheric pressure measured by the pressure sensor in conjunction with reference pressure data stored in the altimeter, where the stored reference data corresponds to the atmospheric pressure at a known altitude.

However, as the weather changes the atmospheric pressure at a given altitude will vary. Therefore, to ensure the altimeter provides accurate altitude information it is necessary to recalibrate the altimeter whenever there is a change in the weather, which requires the altimeter to measure the atmospheric pressure when located at a known altitude.

This may not, however, always be possible when, for example, the user is in an unpolluted area and a weather change occurs, which may be exactly when the user is most likely to require accurate altitude information.

Most cellular telephone networks are or will soon be provided with means for determining the location of a mobile phone using enhanced observed time difference (E-OTD). EP A 0 303 371 describes a radio navigation and tracking system, known as "CURSOR", which uses the spatial coherence of the signals from several radio transmitters to determine the position of a roving receiver. The signals received directly by the roving receiver are compared with those received by a fixed base station whose location is known (base) to determine their phase difference, and hence the difference in range of the base and rover from each transmitter. Three such measurements made on independent transmitters are needed for navigation and tracking in two dimensions to fix the position of the rover relative to the base station and network of transmitters. The unknown quantities calculated for each new position are the spatial x and y coordinates of the rover together with the phase offset between the local oscillators in the equipment of the two receivers.

EP A-0 303 371 also explains how the wider bandwidth signals of modulated transmissions may be used to measure the time difference between the signals received from each transmitter at the base station and the rover. In this case, the position of the peak in the cross correlation can be used as an estimator of the time difference between the two received signals, and hence the difference in distance from the transmitter of the base and rover. As with the phase-measuring system, three such measurements made on three widely-spaced transmitters suffice to calculate the spatial x and y coordinates of the rover together with the time offset between the oscillators in the two receiving stations.

E-OTD allows the longitude and latitude to be determined quite precisely. The altitude estimates are however inherently inaccurate. The reason for this inherent inaccuracy is, simply geometry. Specifically, most of the sources/receivers, i.e. base stations, are in the horizontal plane. To obtain an accurate altitude estimate, one ore more sources/receivers should be nearly overhead. Thus, location systems using E-OTD or similar techniques such as GPS are substantially less accurate in the vertical position (altitude) than in the horizontal position (longitude and latitude).

GB 2 357 582 solves this problem by a mobile telephone comprising a pressure sensor for measuring atmospheric pressure, a receiver for receiving a RF signal incorporating reference altitude and associated atmospheric pressure data and processing means for determining from the received atmospheric pressure data and measured atmospheric pressure the difference in altitude between the handset and the reference altitude. This has the advantage of allowing the mobile phone to measure the altitude without the need to recalibrate the altitude measuring means whenever a change in weather occurs. However, it is necessary to collect reference pressure at a great plurality of locations in order to compensate for local differences in air pressure. For example each base station of the cellular network could be provided with a pressure sensor and equipment for transmitting a RF signal incorporating reference altitude and associated atmospheric pressure. Thus, a considerable investment in the infrastructure has to be made before this known system can operate. Further, the maintenance of the great plurality of pressure sensors will further increase the costs of operating the system.

It is desirable to improve this situation.

DISCLOSURE OF THE INVENTION

On this background, it is an object of the present invention to provide a mobile communication terminal of the kind referred to initially, which is able to recalibrate the altitude measuring means without receiving a signal incorporating reference altitude and associated atmospheric pressure data. This object is achieved in accordance with the claims by providing a terminal of said kind that comprises means for determining the horizontal position at the location of the mobile communication terminal, and means for determining the ground level at said location using the determined horizontal position.

By providing means to establish the ground level, the altitude measuring means can be recalibrated, provided that the mobile communication terminal is at, or very close to ground level such as in the hands of a user standing on the ground or when the height above ground level is known. This has the advantage that there is no need to invest into pressure sensors at the base stations of the cellular network.

Preferably, the mobile communication terminal comprises means for calibrating the processing means using the pressure measured at the location and the determined ground level at said location.

Advantageously, the communication terminal comprises means for determining the altitude of the ground using stored data correlating the horizontal position to a ground level. As discussed above, the horizontal position of the mobile communication terminal can be determined quite accurately e.g. by E-OTD or GPS. When the horizontal position is known accurately, the vertical position, i.e. the ground level can be determined by e.g. using a data set correlating ground levels to horizontal positions.

The data may be stored in the mobile communication terminal, when sufficient memory capacity is available, or the data is stored at a service provider to which said mobile communication terminal can communicate. Hereto the mobile communication terminal preferably comprises means to receive an RF signal incorporating altitude data.

To allow manual input of a horizontal position the location of the mobile communication terminal may comprise means for enabling a user to enter said horizontal position as a longitude and latitude.

Alternatively, the mobile communication terminal may comprise means for enabling a user to enter said horizontal position by indicating an area, a town, a street address, a postal code, or a landmark.

Another feature way to facilitate manual entry of the horizontal position is that the communication terminal may comprise means for displaying a map corresponding to an area around a rough horizontal position indication entered by the user, and means enabling the user to indicate a more exact horizontal position on said map.

Hereto, the mobile communication terminal can be provided with means for receiving a wireless signal incorporating geographical data for displaying a map.

Further, the mobile communication terminal can comprise means for transmitting an wireless signal containing horizontal position data.

If the mobile communication terminal is a cellular phone, it may comprise means for determining its horizontal position through signals from the base stations of the cellular network by using
- cell of origin (COO) and/or
- time of arrival (TOA) and/or
- time difference of arrival (TDOA) and/or
- enhanced observed time difference (E-OTD).

Alternatively the mobile communication terminal according may be provided with means for determining the horizontal position of the location of the mobile communication terminal by using signals received from orbital satellites.

In order to keep track of the altitude along a way passed by e.g. a mountaineer, the mobile communication terminal may be provided with means to store a number of altitude levels determined by said processing means, and means for displaying a graphical histogram of the altitude development over time or relative to the location.

For facilitating orienteers and mountaineers along their way, the mobile communication terminal can be provided with means to receive an altitude profile.

It is yet another object of the present invention to provide a method of calibrating a barometric altimeter of a mobile communication terminal as referred to initially, which is able to recalibrate the altitude measuring means without receiving a signal incorporating reference altitude and associated atmospheric pressure data. This object is achieved in accordance with the claims by providing a method comprising the steps of
- determining the horizontal position at the location of the mobile communication terminal,
- determining the ground level at the location using the determined horizontal position,
- measuring the atmospheric pressure at the location of the mobile communication terminal and
- using the determined ground level to calibrate said barometric altimeter.

By establishing the ground level, the altitude measuring means can be recalibrated, provided that the mobile communication terminal is at, or very close to ground level such as in the hands of a user standing on the ground or the height above ground level is known. This has the advantage that the method enables recalibration without investing into pressure sensors at the base stations.

The method may further comprise the step of retrieving said ground level from stored data correlating ground levels to horizontal positions.

For retrieving the ground level when the data is stored at a remote service provider, the method may further comprise the step of sending a wireless signal incorporating a request for receiving a ground level at a horizontal position.

For sending the ground level retrieved at the remote service provider back to the communication terminal, the method may further comprise the step of sending a wireless signal incorporating a ground level to said mobile communication terminal.

For facilitating manual entry of the horizontal position the method may further comprise the steps of
- enabling the user to enter a horizontal position manually as an area, street address, postal code or landmark,
- comparing the manually entered horizontal position with said stored data,
- requesting the user to enter further detail regarding the horizontal position when the horizontal position is not sufficiently accurate for retrieving an altitude from said stored data,
- and providing the determined ground level when said manually entered horizontal position is sufficiently accurate for retrieving a ground level from said stored data.

Another feature that facilitates manual entry of the horizontal position is the step of displaying on a display of said mobile communication terminal a map of the area in which the mobile is located, and allowing the user to enter a horizontal position by indicating a location on said map.

If the data correlating the horizontal position to an altitude is stored at a remote service provider, the method may further comprise the step of transmitting a wireless signal incorporating the manually entered horizontal position to a service provider.

The method may further comprise the step transmitting a wireless signal incorporating a ground level altitude or incorporating an indication that the provided horizontal position is not sufficiently accurate to determine a ground level in return.

It is yet another object of the present invention to provide a method of determining the altitude of a mobile communication terminal as referred to initially, without using a barometric altimeter. This object is achieved in accordance with the claims by providing a method comprising the steps of
- establishing the horizontal position of the mobile communication terminal, and
- determining the ground level at said horizontal position.

By establishing the ground level, the altitude can be determined provided that the mobile communication terminal is at, or very close to ground level such as in the hands of a user standing on the ground or the height above ground level is known. This has the advantage that the method enables a more accurate altitude determination than with techniques such as E-OTD and GPS, without needing a barometric altimeter.

The method may further comprise the step of retrieving said ground level from stored data correlating ground levels to a horizontal position. Thus, the ground level can be retrieved without complicated calculations.

For retrieving the ground level when the data is stored at a remote service provider, the method may further comprise the step of sending a wireless signal incorporating a request for receiving a ground level at a horizontal position.

For sending the ground level retrieved at the remote service provider back to the communication terminal, the method may further comprise the step of sending a wireless signal incorporating a ground level to said mobile communication terminal.

For facilitating manual entry of the horizontal position the method may further comprise the steps of
   enabling the user to enter a horizontal position manually as an area, street address, postal code or landmark,
   comparing the manually entered horizontal position with said stored data,
   requesting the user to enter further detail regarding the horizontal position when the horizontal position is not sufficiently accurate for retrieving an altitude from said stored data,
   and providing the determined ground level when said manually entered horizontal position is sufficiently accurate for retrieving a ground level from said stored data.

Another feature that facilitates manual entry of the horizontal position is the step of displaying on a display of said mobile communication terminal a map of the area in which the mobile is located, and allowing the user to enter a horizontal position by indicating a location on said map.

If the data correlating the horizontal position to an altitude is stored at a remote service provider, the method may further comprise the step of transmitting a wireless signal incorporating the manually entered horizontal position to a service provider.

The method may further comprise the step transmitting a wireless signal incorporating a ground level altitude or incorporating an indication that the provided horizontal position is not sufficiently accurate to determine a ground level in return.

Further objects, features, advantages and properties of the mobile communication terminal, a method of calibrating and a method of determining an altitude according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

Figure 1:
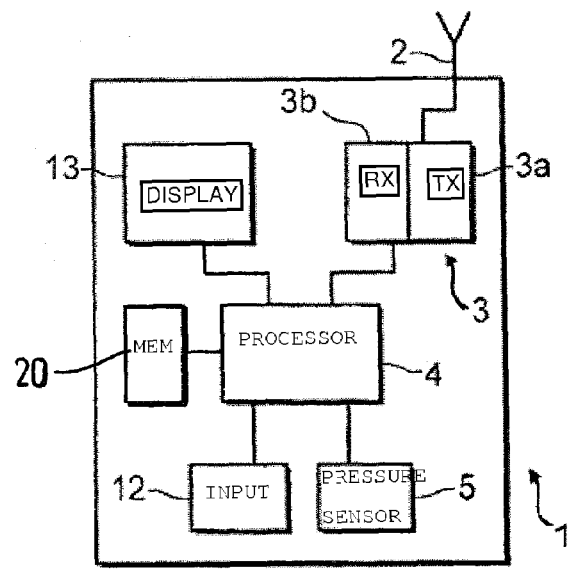
FIG. 1 shows a schematic block diagram of a mobile phone according to an embodiment of the present invention.

In the following detailed description, a mobile communication terminal according to the invention in the form of a hand portable phone, preferably a cellular/mobile phone, will be described by the preferred embodiments.

The general term "ground level" as used here comprises all types of terrain, including the surface level of lakes and other waters, above and under sea level.

The general term "horizontal position" as used here includes any format of indicating the position in the horizontal plane, such as by latitude and longitude or any other suitable coordinate system.

The general term "service provider" as used here includes any equipment including means to receive a signal incorporating data, such as SMS messages, means to process said data and means to send a signal incorporating data in response to the received signal.

The mobile phone 1 has an antenna 2 for receiving and transmitting RF signals from/to a base station 16. The base station 16 is of conventional design, as is known to a person skilled in the art. The data structure of the RF signal (e.g. the logical/physical channel arrangement and the slot/frame sizes) is as defined in the GSM standard.

The antenna 2 is connected to an input of a transceiver 3. The transceiver 3 comprises a transmitter 3a and a receiver 3b. The transmitter 3a converts a baseband signal generated within the mobile phone 1 into a RF signal for transmission via antenna 2. The receiver 3b receives a RF signal transmitted to the mobile phone 1 and converts the RF signal into a baseband signal.

The transceiver 3 is coupled to a processor 4. The processor 4 controls the operation of the mobile phone 1 and processes control data received and transmitted to/from the mobile phone 1.

Additionally the mobile phone 1 has a pressure sensor 5. An output from the pressure sensor 5 is coupled to an input on the processor 4. The pressure sensor 5 is a transducer that converts a pressure measurement into an electrical signal suitable for processing by the processor 4. Preferably, the pressure sensor 5 is manufactured from semi-conductor technology. This has various advantages over conventional resistant strain pressure gauges, such as greater sensitivity, high linearity, very low pressure and temperature hysteresis, high reliability, fast response and is small in size.

Figure 2:
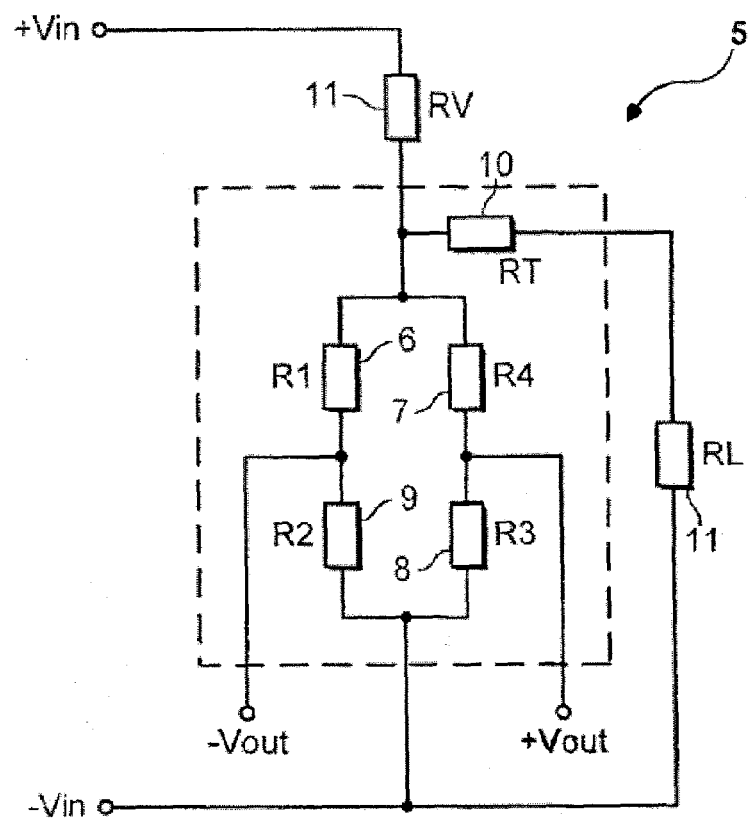
FIG. 2 shows a circuit representation of a pressure sensor incorporated in a radiotelephone according to the present invention.

FIG. 2 shows a circuit representation of the pressure sensor 5. Resistors 6, 7, 8, 9 are pressure sensitive resistors connected as a wheatstone bridge. Resistor 10 is a temperature dependent resistor that is used to compensate for temperature drift of the pressure sensor. Resistors 11 are external resistors for temperature compensation purposes.

The mobile telephone 1 also includes input means 12, for example a keypad and/or microphone, to allow data to be input into the mobile telephone 1. An output from the input means 12 is coupled to an input on the processor 4.

Also coupled to the processor 4 is a display 13. The display 13 is used to displaying information to a user.

The pressure sensor 5 measures the atmospheric pressure at the altitude of the mobile telephone 1. The measured pressure information is passed to the processor 4 in the form of an electrical signal.

Using a stored reference altitude and associated atmospheric pressure data with the measured atmospheric pressure the processor 4 is able to determine the altitude difference between the mobile telephone 1 and the reference altitude. The processor 4 can determine the altitude by reference to a pressure/altitude table or with reference to Laplace law of atmospheres:

$$P = P0e$$

where P0 is the pressure at sea level, M is the average molar mass of the air, R is the ideal gas constant, T is the gas temperature and A is the altitude for a given atmospheric pressure P.

For altitudes between −1000 and 35332 feet this equation can be approximated to:

$$A = 145375(1 - (P/P0))$$

From this equation the mobile telephone 1 can determine the difference in altitude between the mobile telephone 1 and the reference altitude. Further, by adding the reference altitude, typically feet above sea level, to the difference in altitude, the mobile telephone 1 can determine the altitude of the mobile telephone 1 with respect to sea level.

In operation the reference pressure needs to be recalibrated regularly since the atmospheric pressure at a given altitude may vary due to weather influences. A recalibrated reference pressure is established by determining the altitude of the mobile phone 1 and measuring the local atmospheric pressure. To determine the altitude of the mobile phone 1 as a first step the mobile phone 1 establishes its horizontal position.

Several methods can be used to determine the horizontal position, as explained in more detail below. When the horizontal position is established it is used to determine the local ground level. Hereto, the horizontal position is compared with data stored either in the mobile phone 1, or at a service provider 15 to which the mobile phone 1 can establish contact via RF signals. The data correlates a ground level to a horizontal position, e.g. in a look-up table and thus the local ground level can be determined. The local atmospheric pressure is measured and stored together with the retrieved ground level as the new reference height and pressure.

The above procedure of course requires that the calibration is carried out at ground level, i.e. not in a building high above ground level or in an aircraft high above ground level or that the height above ground level is known. For calibrating the mobile phone 1 in a high-rise building or other construction the user may indicate the floor or indicate the height in feet above ground level. The software in the mobile phone 1 will adjust the calibration to the indicated height above ground level.

Figure 3:
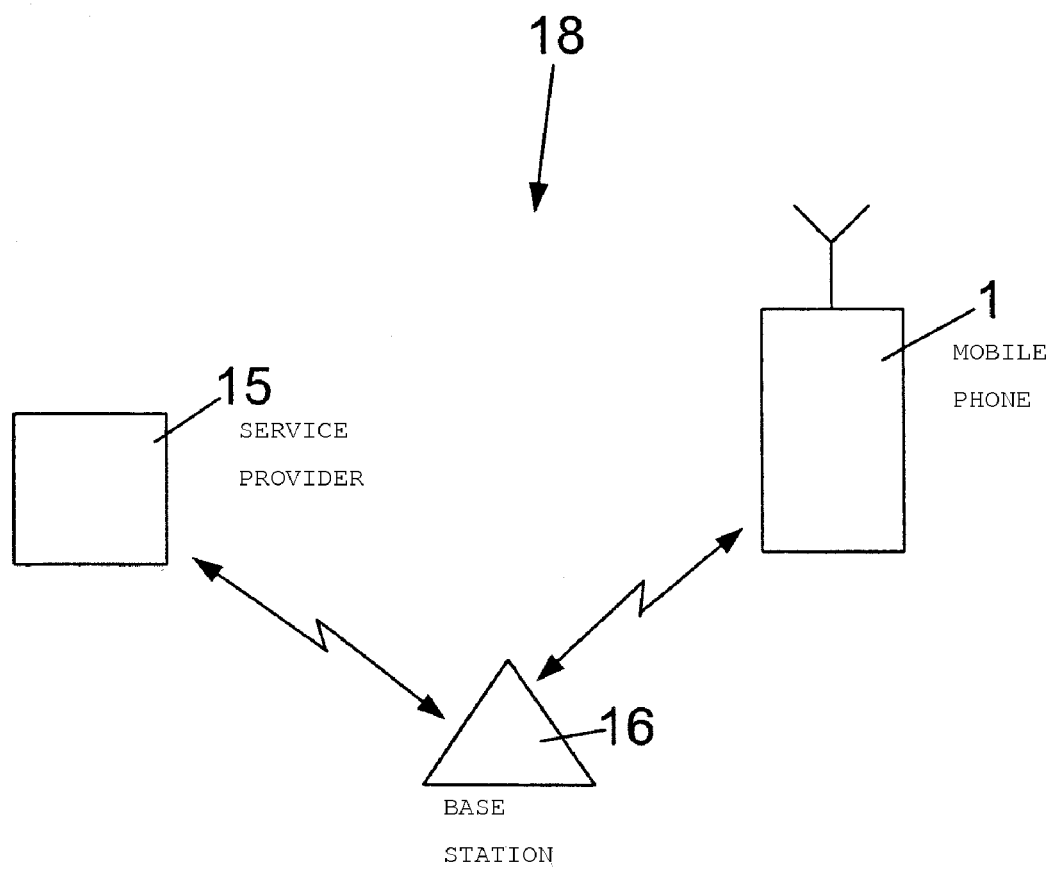
FIG. 3 shows a cellular communication system according to an embodiment of the present invention.

FIG. 3 shows a cellular communication system 18 having a base station 16 and a mobile telephone 1. According to a preferred embodiment, the mobile phone 1 comprises software to carry out Enhanced Observed Time Difference (E-OTD) to determine its horizontal position. E-OTD relies upon measuring the time at which signals from a base station 16 arrive at two geographically dispersed locations—the mobile phone 1 itself—and a fixed measuring point known as the Location Measurement Unit (LMU) whose location is known. The position of the mobile phone 1 is determined by comparing the time differences between the two sets of timing measurements. To obtain accurate triangulation, OTD measurements are needed from at least three geographically distinct base stations. Based on the measured values, the location of the mobile phone 1 can be calculated either by the cellular network or in the mobile phone itself, if all the needed information is available in the mobile phone 1. The horizontal position calculation can be based on one of two possible variants of E-OTD; known as "circular" and "hyperbolic". The software in the mobile phone 1 translates the observed time difference into an estimate of the horizontal position of the mobile phone 1 expressed in X and Y readings based on longitude and latitude readings. Alternatively, the software for calculating out the position estimate is located at a service provider 15, and the mobile phone 1 receives a signal, such as an SMS message incorporating a horizontal position.

The details of the E-ODT system are well known to the skilled person, from e.g. GSM 03.71 version 7.3.0 Release 1998, ETSI TS 101 724 V7.3.0 (2000-02), Technical Specification Digital cellular telecommunications system (Phase 2+); Location Services (LCS); (Functional description)—Stage 2, hereby incorporated by reference. The mobile phone 1 may also comprise software and/or hardware enabling it to use other techniques for automatic determination of its horizontal position such as the Global Positioning System (GPS) using signals received from orbital satellites, or other cellular network based techniques such as Time of Arrival (TOA), cell of origin (COO), or time difference of arrival (TDOA, the details of which are all well known to the skilled person).

The mobile phone comprises a memory 20 coupled to the processor 4. The memory 20 contains data correlating horizontal positions to the ground level, i.e. a digital version of a contour map. The data may be limited to a specific region or area for limiting the total amount of data to be stored and is preferably in the form of a look-up table based on longitude and latitude coordinates. Further, the data is advantageously stored with a higher resolution in areas which have large differences in ground level over a small horizontal area and vice versa. For areas with extremely large differences in ground level over a small horizontal area, such as around a cliff, no ground level data is provided in order to avoid erroneous calibrations. After establishing the horizontal position, the processor retrieves the corresponding ground level and stores it together with the momentary reading of the pressure sensor 5 as the new reference pressure and altitude. Advantageously, the processor sends a signal to the display 13 to show the altitude.

According to another preferred embodiment, the data correlating horizontal positions to the ground level is stored at a service provider 15 which is connected to the cellular network. To enable the ground level data to be provided to mobile telephone 1, a connection is established between mobile telephone 1 and the service provider 15, via base station 16, as is well known to a person skilled in the art. After establishing the horizontal position, the mobile phone sends an RF signal incorporating the horizontal position via the base station 16 and the cellular network to the service provider 15. Typically, the data is transmitted to and from the mobile phone 1 as a short message service (SMS) message, however the data can be transmitted in other data formats. Upon receipt of the signal incorporating the horizontal position of the mobile phone 1, the service provider 15 retrieves the corresponding ground level and sends a signal such as an SMS message containing the retrieved ground level back to the mobile phone 1. The content of the received signal is passed on to the processor 4 and the processor 4 stores the ground level together with the momentary output of the pressure sensor 5 as the new reference pressure and altitude.

Figure 4:
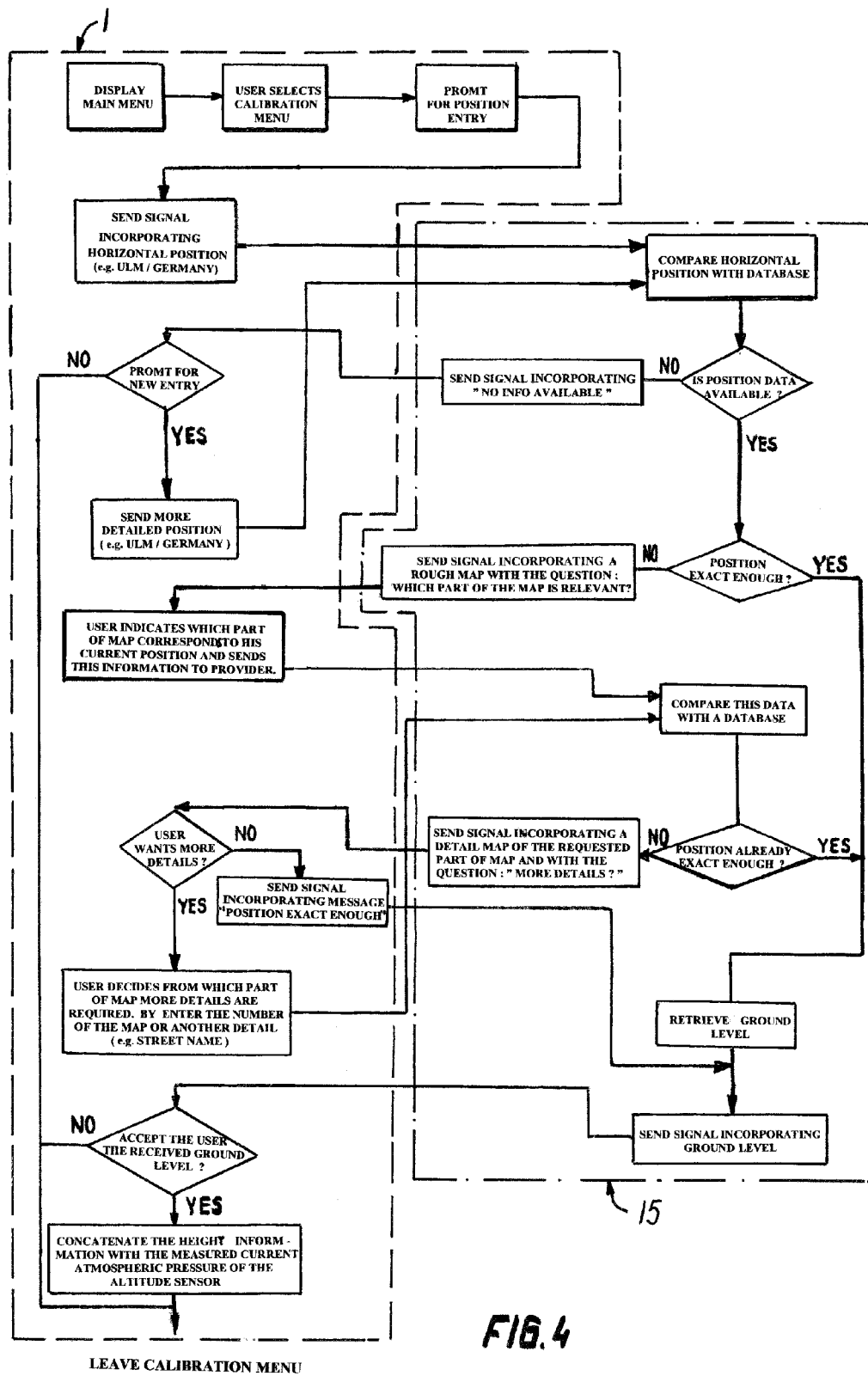
FIG. 4 shows a flow chart illustrating the operation of recalibration of the barometric altimeter.

According to another embodiment, the mobile phone 1 is provided with a user interface to determine its horizontal position. The user interface comprises software that through interaction with the display and the keypad allows entry of the horizontal position of the mobile phone. With reference to FIG. 4 the procedure of establishing the horizontal position is explained step by step. After selecting altimeter calibration in the main menu the display 13 prompts for the input of the horizontal position. The user may enter the horizontal position in any current address/location format, such as area, street address, postal code or landmark, e.g. "Ulm" (a city in southern Germany). The mobile phone 1 sends an RF signal, such as an SMS message, incorporating the horizontal position indication "Ulm" to the service provider 15. The service provider 15, compares the received horizontal position with an horizontal position database i.e. a database containing data correlating horizontal positions to ground levels.

If the received horizontal position does not match with any position in the database, the service provider 15 sends a signal incorporating a message that the horizontal position is not recognized. The software in the mobile phone prompts the user to enter a new horizontal position upon receipt of the message.

If the horizontal position can be identified, the service provider determines if the horizontal position is accurate enough to retrieve a useful ground level. If the horizontal position is accurate enough the software of the service provider 15 retrieves the ground level from the database and sends a signal incorporating the ground level to the mobile phone 1.

Figure 5A:
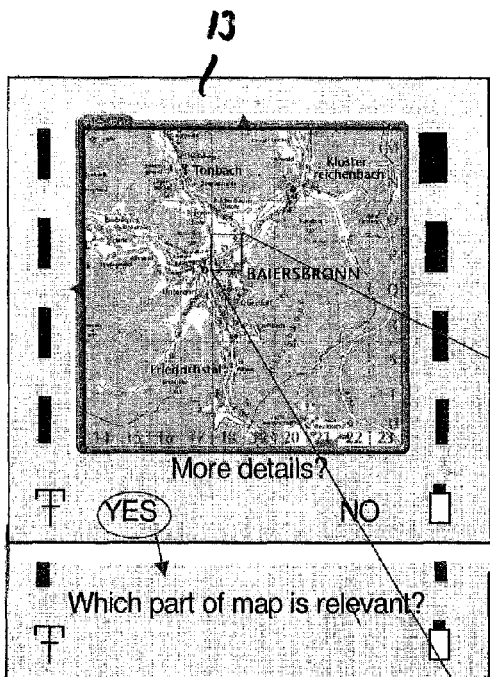
FIGS. 5a, 5b and 5c show the use of the display of the mobile phone to manually enter a horizontal position.
Figure 5B:
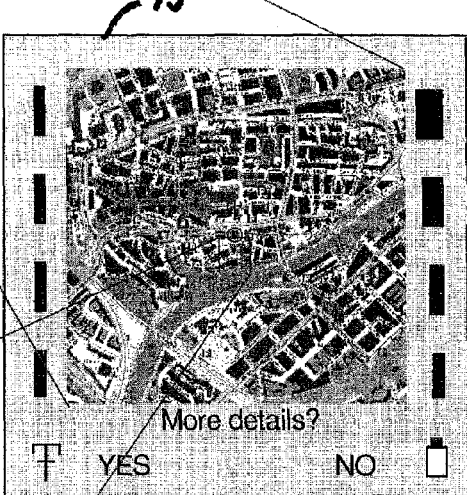
Figure 5C:
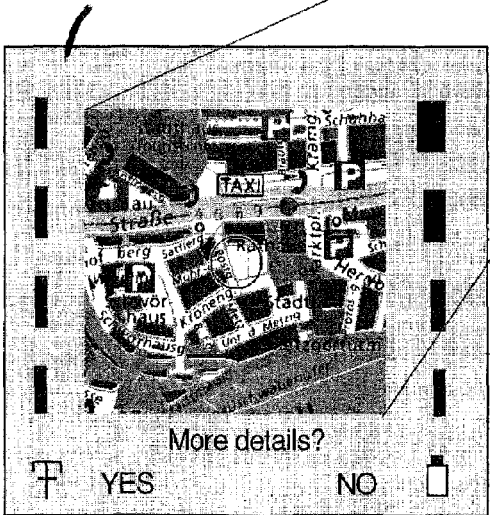

If the horizontal position is not exact enough to make a useful estimate of the ground level, the service provider 15 sends back a signal incorporating a rough map of the area around the received horizontal position to the mobile phone 1. When the mobile phone 1 receives this signal, it sends it to the processor 4, and the software enables the map to be shown on the display 13 and prompts the user to indicate the horizontal position of the mobile phone 1 more precisely by dragging a rectangle over the map on the display 13. When the rectangle is positioned correctly, the software prompts for zooming in on the selected area of the map, by displaying the text "More details?" under the map. By selecting "YES" the user can step by step zoom in on the horizontal position if the mobile phone 1 as shown in FIGS. 5a, 5b and 5c. Alternatively, the map may be divided into several quadrants, and the user selects the appropriate quadrant by entering the corresponding number using the alphanumerical keypad. When the horizontal position of the mobile phone 1 has thus been determined accurately the mobile phone 1 sends an RF signal containing the horizontal position to the service provider 15. The service provider 15 analyses if the received horizontal position is exact enough to retrieve an accurate ground level. If the horizontal position is not accurate enough, the above procedure of sending and displaying a map can be repeated. If the horizontal position is accurate enough, the ground level is retrieved and sent to the mobile phone 1 as described above. On receipt of the ground level the software in the mobile phone 1 prompts the user to accept the received ground level, and if accepted, the received ground level is used as reference altitude as described above.

The reference pressure and altitude calibration also be carried out manually, e.g. when the mobile phone 1 is at a location where the altitude is known (at a landmark, a mountain peak, a lake, etc.). The altitude is simply entered, the local atmospheric pressure is measured and they are stored as reference pressure and altitude.

Figure 6:
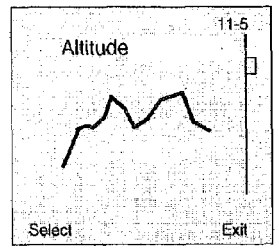
FIG. 6 shows a histogram on the display of the mobile phone.

The altitude measured by the mobile phone 1 is displayed on the display 13 in the form of digits, or as shown in FIG. 6 as a histogram showing the altitude against time or against the traveled distance. The mobile phone 1 may further be provided with software to store altitude profiles according to days or trips. The software also allows to download an altitude profile to be fulfilled for training purposes. The software operating the user interface including the menus shown on the display 13 may further include a menu allowing to request the altitude of certain locations (horizontal positions) e.g. to request the altitude of a supply station. Hereto, the mobile phone sends an RF signal incorporating a horizontal position, that could e.g. correspond to the location of a supply station, via the cellular network to the service provider 15. The service provider 15 retrieves the ground level from a database and sends a signal incorporating the corresponding ground level to the mobile phone 1.

Figure 7:
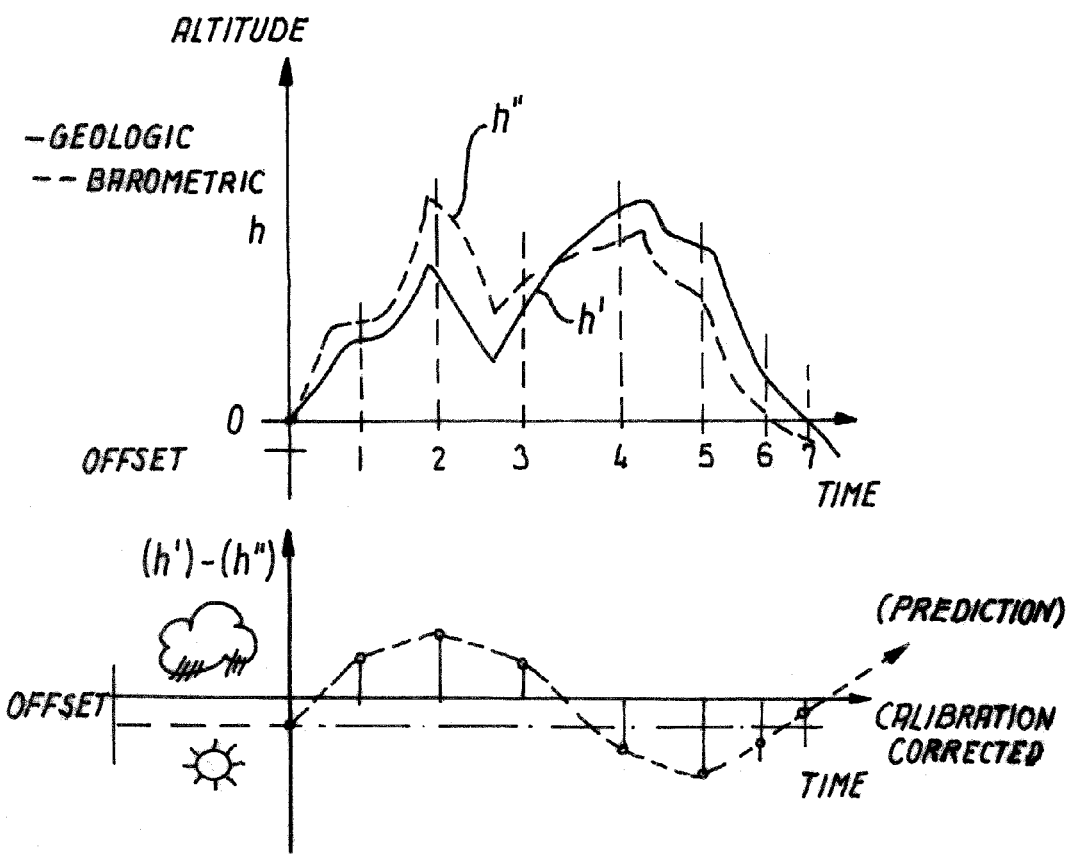
FIG. 7 shows weather data on a display of the mobile phone.

The mobile phone 1 may further comprise software that calculates the weather influenced pressure changes, based on the changes in the reference pressure between calibrations, and calculated back to a standard reference altitude. This software further able to calculate a trend in the weather influenced atmospheric pressure changes, and derives there from a weather forecast/trend. Both the atmospheric pressure trend and the weather forecast can be displayed on the display 13 (cf. FIG. 7), and an alarm can sound when a bad weather forecast is created.

According to another preferred embodiment (not shown) the mobile phone does not comprise a pressure sensor. The altitude of the mobile phone is established by determination of the horizontal position and estimation of the ground level from the determined horizontal position. The altitude of the mobile phone 1 can thus be determined when the mobile phone is close to ground level or when the altitude above ground level is known. The mobile phone is practically identical to the mobile phones according the other preferred embodiments described above, except that it does not need to comprise a pressure sensor. The horizontal position can be determined in the same ways as described above.

Although the present invention has been described in detail for purpose of illustration, it is understood that such detail is solely for that purpose, and variations can be made therein by those skilled in the art without departing from the scope of the invention.

Thus, while the preferred embodiments of the devices and methods have been described in reference to the environment in which they were developed, they are merely illustrative of the principles of the inventions. Other embodiments and configurations may be devised without departing from the scope of the appended claims.

The invention claimed is:

1. A mobile communication terminal comprising:
   a wireless signal transceiver for receiving and transmitting wireless signals,
   a pressure sensor for measuring atmospheric pressure,
   a processor connected to the transceiver and pressure sensor configured to determine from the measured atmospheric pressure the altitude of the communication terminal, the processor is further configured to determine the horizontal position at the location of the mobile communication terminal and the ground level at said location using said determined horizontal position.

2. A mobile communication terminal according to claim 1, wherein the processor is configured to be calibrated using the pressure measured at said location and the determined ground level at said location.

3. A mobile communication terminal according to claim 1, characterized in that said processor is configured to determine the ground level using stored data correlating the horizontal position to a ground level.

4. A mobile communication terminal according to claim 3, characterized in that said data is stored in the mobile communication terminal.

5. A mobile communication terminal according to claim 3, characterized in that said data is stored at a service provider with which said mobile communication terminal can communicate.

6. A mobile communication terminal according to claim 3, wherein the wireless signal transceiver is configured to receive a wireless signal incorporating ground level data.

7. A mobile communication terminal according to claim 3, characterized in that the processor is connected to a user interface configured for enabling a user to enter said horizontal position as a longitude and latitude.

8. A mobile communication terminal according to claim 7, wherein the user interface is further configured for enabling a user to enter said horizontal position by indicating an area, a town, a street address, a postal code, or a landmark.

9. A mobile communication terminal according to claim 8, wherein the user interface comprises a display for displaying a map corresponding to an area around a rough horizontal position indication entered by the user, and the user interface is further configured to enable the user to indicate a more exact horizontal position on said map.

10. A mobile communication terminal according to claim 9, wherein the wireless signal transceiver of said mobile communication terminal is configured for receiving a wireless signal incorporating geographical data for displaying said map.

11. A mobile communication terminal according to claim 10, wherein the wireless signal transceiver is further configured for transmitting a wireless signal containing horizontal position data.

12. A mobile communication terminal according to claim 1, characterized in that said mobile communication terminal is a cellular phone, wherein the processor is further configured for determining the horizontal position through signals from base stations of the cellular network by using
    cell of origin and/or
    time of arrival and/or
    time difference of arrival and/or
    enhanced observed time difference.

13. A mobile communication terminal according to claim 1, characterized in that said processor is configured to use signals received from orbital satellites for determining said horizontal position of the location of the mobile communication terminal.

14. A mobile communication terminal according to claim 1, characterized in that said mobile communication terminal comprises a memory configured to store a number of altitude levels determined by the processor, and a display for displaying a graphical histogram of the altitude development over time or relative to the traveled route.

15. A mobile communication terminal according to claim 1, wherein the wireless signal transceiver of said mobile communication terminal is configured to receive an altitude profile.

16. Method of calibrating a barometric altimeter of a mobile communication terminal, comprising:
    determining the horizontal position at the location of the mobile communication terminal,
    determining the ground level at said location using the determined horizontal position,
    measuring the atmospheric pressure at the location of the mobile communication terminal; and
    using the determined ground level to calibrate said barometric altimeter.

17. Method according to claim 16, further comprising retrieving said ground level from stored data correlating ground levels to a horizontal position.

18. Method according to claim 16, further comprising sending a wireless signal incorporating a request for receiving a ground level at a horizontal position.

19. Method according to claim 16, further comprising sending a wireless signal incorporating a ground level to said mobile communication terminal.

20. Method according to claim 16, further comprising:
    enabling the user to enter a horizontal position manually as an area, street address, postal code or landmark,
    comparing the manually entered horizontal position with said stored data,
    requesting the user to enter further detail regarding the horizontal position when the horizontal position is not sufficiently accurate for retrieving an altitude from said stored data,
    and providing the determined ground level when said manually entered horizontal position is sufficiently accurate for retrieving a ground level from said stored data.

21. Method according to claim 20, further comprising displaying on a display of said mobile communication terminal a map of the area in which the mobile is located, and allowing the user to enter a horizontal position by indicating a location on said map.

22. Method according to claim 20, further comprising transmitting a wireless signal incorporating the manually entered horizontal position to a service provider.

23. Method according to claim 20, further comprising transmitting a wireless signal incorporating a ground level altitude or incorporating an indication that the provided horizontal position is not sufficiently accurate to determine a ground level.

24. Method of determining the altitude of a mobile communication terminal, comprising:
    establishing the horizontal position of the mobile communication terminal,
    determining the ground level at said horizontal position,
    establishing the altitude of the mobile communication terminal according to the horizontal position and the ground level, and
    displaying the established altitude on a display of the mobile communication terminal.

25. Method according to claim 24, further comprising retrieving said ground level from stored data correlating ground levels to a horizontal positions.

26. Method according to claim 24, further comprising sending a wireless signal incorporating a request for receiving a ground level at a horizontal position.

27. Method according to claim 24, further comprising sending a wireless signal incorporating a ground level to said mobile communication terminal.

28. Method according to claim 24, further comprising:
    enabling the user to enter a horizontal position manually as an area, street address, postal code or landmark,
    comparing the manually entered horizontal position with said stored data, requesting the user to enter further detail regarding the horizontal position when the horizontal position is not sufficiently accurate for retrieving an altitude from said stored data, and providing the determined ground level when said manually entered horizontal position is sufficiently accurate for retrieving a ground level from said stored data.

29. Method according to claim 28, further comprising displaying on a display of said mobile communication terminal a map of the area in which the mobile is located, and allowing the user to enter a horizontal position by indicating a location on said map.

30. Method according to claim 28, further comprising transmitting a wireless signal incorporating the manually entered horizontal position to a service provider.

31. Method according to claim 28, further comprising transmitting a wireless signal incorporating a ground level altitude or incorporating an indication that the provided horizontal position is not sufficiently accurate to determine a ground level.

* * * * *